(12) United States Patent
Sele et al.

(10) Patent No.: US 6,837,311 B1
(45) Date of Patent: Jan. 4, 2005

(54) HYBRID RISER CONFIGURATION

(75) Inventors: Arne Sele, Hosle (NO); Magne Nygard, Sandvika (NO)

(73) Assignee: Aker Riser Systems AS, Oslo (NO)

( * ) Notice: Subject to any disclaimer, the term of this patent is extended or adjusted under 35 U.S.C. 154(b) by 0 days.

(21) Appl. No.: 10/069,346

(22) PCT Filed: Aug. 24, 2000

(86) PCT No.: PCT/NO00/00279

§ 371 (c)(1),
(2), (4) Date: Jun. 13, 2002

(87) PCT Pub. No.: WO01/14687

PCT Pub. Date: Mar. 1, 2001

(30) Foreign Application Priority Data

Aug. 24, 1999 (NO) .............................................. 994094

(51) Int. Cl.$^7$ .............................................. E21B 29/12
(52) U.S. Cl. ...................... 166/353; 166/350; 166/345; 405/224.4
(58) Field of Search ................................ 166/353, 345, 166/350, 367, 356, 344, 342, 349; 405/224.2, 224.4, 224

(56) References Cited

U.S. PATENT DOCUMENTS

| | | | | | |
|---|---|---|---|---|---|
| 3,677,302 | A | * | 7/1972 | Morgan ...................... 138/106 |
| 3,685,300 | A | * | 8/1972 | Mott et al. ................... 405/227 |
| 3,747,632 | A | * | 7/1973 | Kok et al. ................... 137/375 |
| 3,769,521 | A | * | 10/1973 | Caldwell et al. ....... 204/196.03 |
| 4,043,575 | A | * | 8/1977 | Roth ........................... 285/90 |
| 4,188,156 | A | * | 2/1980 | Fisher et al. ............. 405/224.3 |
| 4,280,719 | A | * | 7/1981 | Daniel et al. ................. 285/90 |
| 4,330,140 | A | * | 5/1982 | Hampton ...................... 285/39 |
| 4,332,509 | A | * | 6/1982 | Reynard et al. .......... 405/168.1 |
| 4,415,293 | A | * | 11/1983 | Engel et al. ................. 205/732 |
| 4,462,717 | A | * | 7/1984 | Falcimaigne ............. 405/224.3 |
| 4,470,722 | A | * | 9/1984 | Gregory ................... 405/224.2 |
| 4,496,173 | A | * | 1/1985 | Roche et al. .................. 285/24 |
| 4,527,928 | A | * | 7/1985 | Rutherford et al. .......... 405/211 |
| 4,596,531 | A | * | 6/1986 | Schawann et al. ........... 441/133 |
| 4,646,840 | A | * | 3/1987 | Bartholomew et al. ...... 166/350 |
| 4,740,109 | A | * | 4/1988 | Horton ..................... 405/224.2 |
| 5,377,763 | A | * | 1/1995 | Pearce et al. ................ 166/367 |
| 5,439,323 | A | * | 8/1995 | Nance ...................... 405/195.1 |
| 5,634,671 | A | * | 6/1997 | Watkins ........................ 285/18 |
| 5,657,823 | A | * | 8/1997 | Kogure et al. .............. 166/340 |
| 6,102,077 | A | * | 8/2000 | Legallais et al. ............ 138/115 |
| 6,146,052 | A | * | 11/2000 | Jacobsen et al. ............ 405/169 |
| 6,250,395 | B1 | * | 6/2001 | Torres ......................... 166/382 |
| 6,321,844 | B1 | * | 11/2001 | Thiebaud et al. ........... 166/345 |
| 6,415,867 | B1 | * | 7/2002 | Deul et al. .................. 166/367 |
| 6,419,277 | B1 | * | 7/2002 | Reynolds ................. 285/123.1 |
| 6,530,430 | B2 | * | 3/2003 | Reynolds .................... 166/346 |

* cited by examiner

*Primary Examiner*—Thomas B. Will
*Assistant Examiner*—Thomas A Beach
(74) *Attorney, Agent, or Firm*—Townsend and Townsend and Crew LLP

(57) ABSTRACT

Hybrid riser configuration comprising a plurality of steel riser pipes substantially inserted in aluminium guide conduits, with buoyancy means and tethering tension means, the guide conduits and riser pipes being rigidly connected to a base anchored to the ocean floor. The guide conduits serve as the tethering tension means and as radial constraint for the respective riser pipe therein to allow the riser pipe to buckle in elastic deformation (Euler) to form a spiral when expanding due to service pressure and temperature. A method for installing the riser configuration is also disclosed.

19 Claims, 5 Drawing Sheets

HYBRID RISER CONFIGURATION

FIELD OF THE INVENTION

The present invention relates to a hybrid riser configuration, primarily for offshore hydrocarbon services.

BACKGROUND OF THE INVENTION

The hybrid riser concept has developed from top tension risers. A principal feature is that it accommodates relative motion between a floating structure and a rigid metal riser by connecting them with flexible jumpers. The first hybrid riser installed, and so far the only, was a single riser anchored to the structure with a tensioned cable. Current concepts mainly involve multiple risers with tension provided by submerged buoyancy anchored by a tether.

A principal advantage of hybrid risers tensioned by submerged buoyancy is that they are much less exposed to wave-induced cyclic loads and are not excited significantly by vessel motion either. The challenge of such designs is to accommodate the relative deformation between the central tether and the risers. The risers are subjected to temperature, internal pressure, and lateral deflection, which give rise to relative deformation.

Several solutions accommodating these relative deformations can be envisioned. The most efficient solution will depend on project-specific conditions, and there may not be one single design solution which is more cost effective in all cases. The most attractive solution will be the one minimizing the major cost drivers, which are syntactic foam for insulation, flexible flowline connectors, flexible jumpers, offshore assembly, tow-out, and offshore installation.

SUMMARY OF THE INVENTION

Objects of the present invention are to accommodate relative expansion of the riser tubes in a simple and reliable manner, and to reduce cost and risk exposure in connection with fabrication and installation of a hybrid riser configuration.

In accordance with the present invention, a hybrid riser configuration having a submerged tower comprises a plurality of riser pipes substantially inserted in guide conduits. The hybrid riser configuration also includes a buoyancy structure acting as a power tensioning structure. The riser pipes and guide conduits are connected to a base anchored to the ocean floor. A plurality of the guide conduits act as multiple tethers, with each guide conduit further acting as a radial constraint in elastic spiral deformation of the riser pipe inside. In accordance with one aspect of the present invention, during tow-out and insulation the guide conduits provide necessary buoyancy to make the riser configuration, except the base and buoyancy structure, nearly mutually buoyant.

The present invention also provides a method for installing a riser configuration having a submerged tower that comprises a plurality of riser pipes substantially inserted in guide conduits and also having a buoyancy tank and gravity base connected by the riser pipes and guide conduits. The method includes fabricating a bundle of guide conduits and riser pipes on a roller bed or rail bed from which it can be launched, connecting the buoyancy tank and gravity base to opposite ends of the bundle, sealing at least a plurality of the guide conduits and riser pipes of the bundle, launching the resultant structure and connecting the buoyancy tank and gravity base ends of the structure to respective towing vessels via towing wires, flooding the buoyancy tank to provide it with substantial negative buoyancy so that both the tank and the base will act as clump weights, towing the structure to the offshore location for its installation as a sub-surface tow while maintaining sufficient angle and tension in the towing wires to maintain substantial tension in the pipe bundle, lowering the base end of the structure by paying out the towing wire connected to the base, permitting water to enter the spaces formed between the riser pipes and their respective guide conduit when the base has reached a predetermined depth in order to limit the differential pressure across the wall of the guide conduits, continuing to lower the base end of the structure until the structure is perpendicular and suspended from the towing wire connected to the buoyancy tank, and lowering the structure to allow the base to penetrate the bottom mud-line and anchor the base to the ocean floor, and removing the water ballast and towing wire from the buoyancy tank, thus providing tension in the guide conduits.

DESCRIPTION OF THE PREFERRED EMBODIMENTS

Figure 1:
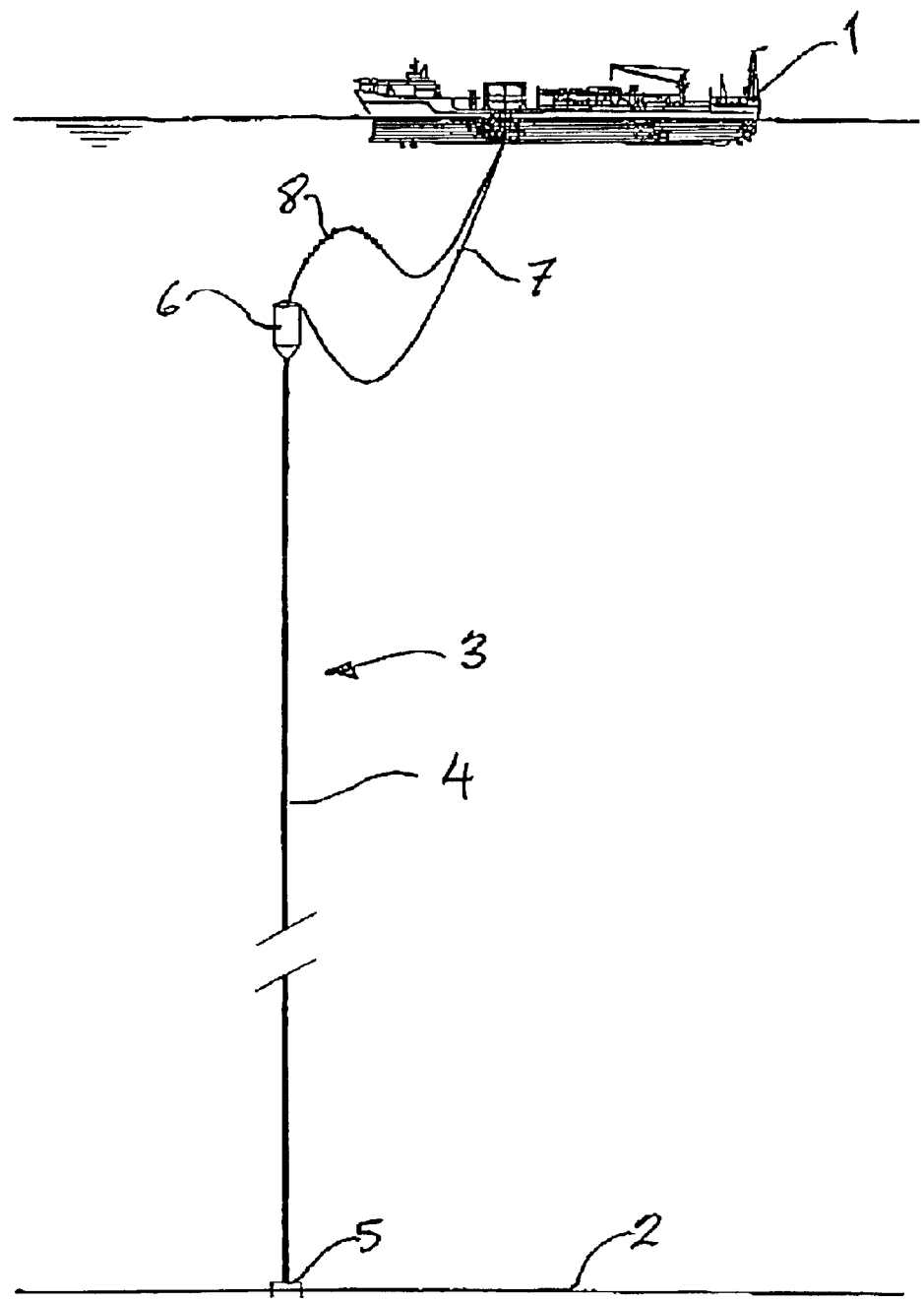
FIG. 1 shows an elevational view of a surface vessel connected to equipment on the ocean floor by a hybrid riser embodying the present invention.

Referring to the drawings, FIG. 1 shows a surface vessel 1, e.g. a production ship for crude oil, connected to equipment (not shown) on the ocean floor 2 through a hybrid riser generally designated 3 and embodying the present invention. The riser 3 comprises a riser tower 4 connected at its lower end to a base 5 at the ocean floor 2 and at its upper end to a so-called soft tank buoyancy means 6 keeping the riser tower 4 in sufficient tension to avoid global buckling thereof.

At the buoy 6 the multiple risers of the tower 4 are connected to flexible jumper hoses 7, 8, the jumpers 7 carrying produced crude oil to the production ship 1 and the jumpers 8 carrying treated product from the ship 1 to an oil export system.

Figure 2:
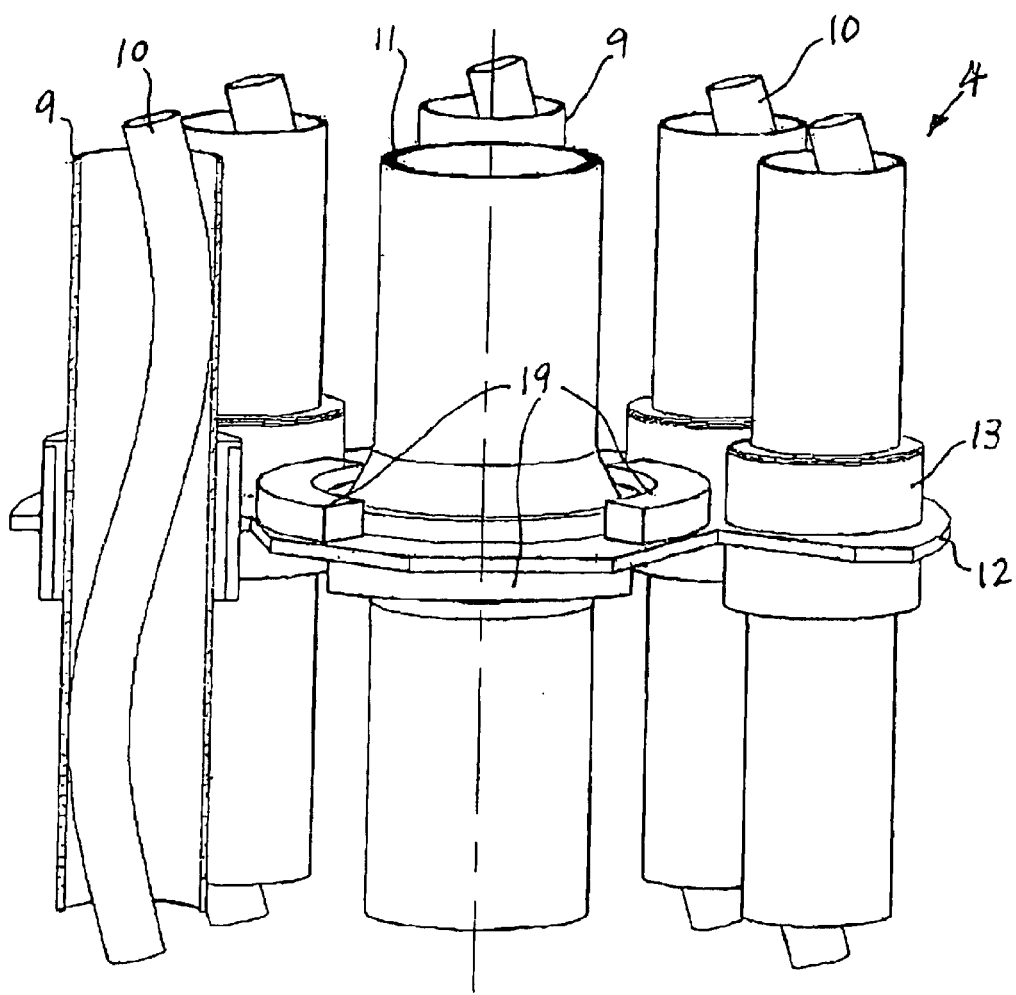
FIG. 2 is a fragmentary perspective view, partly in section, of a middle portion of the riser in FIG. 1.
Figure 3:
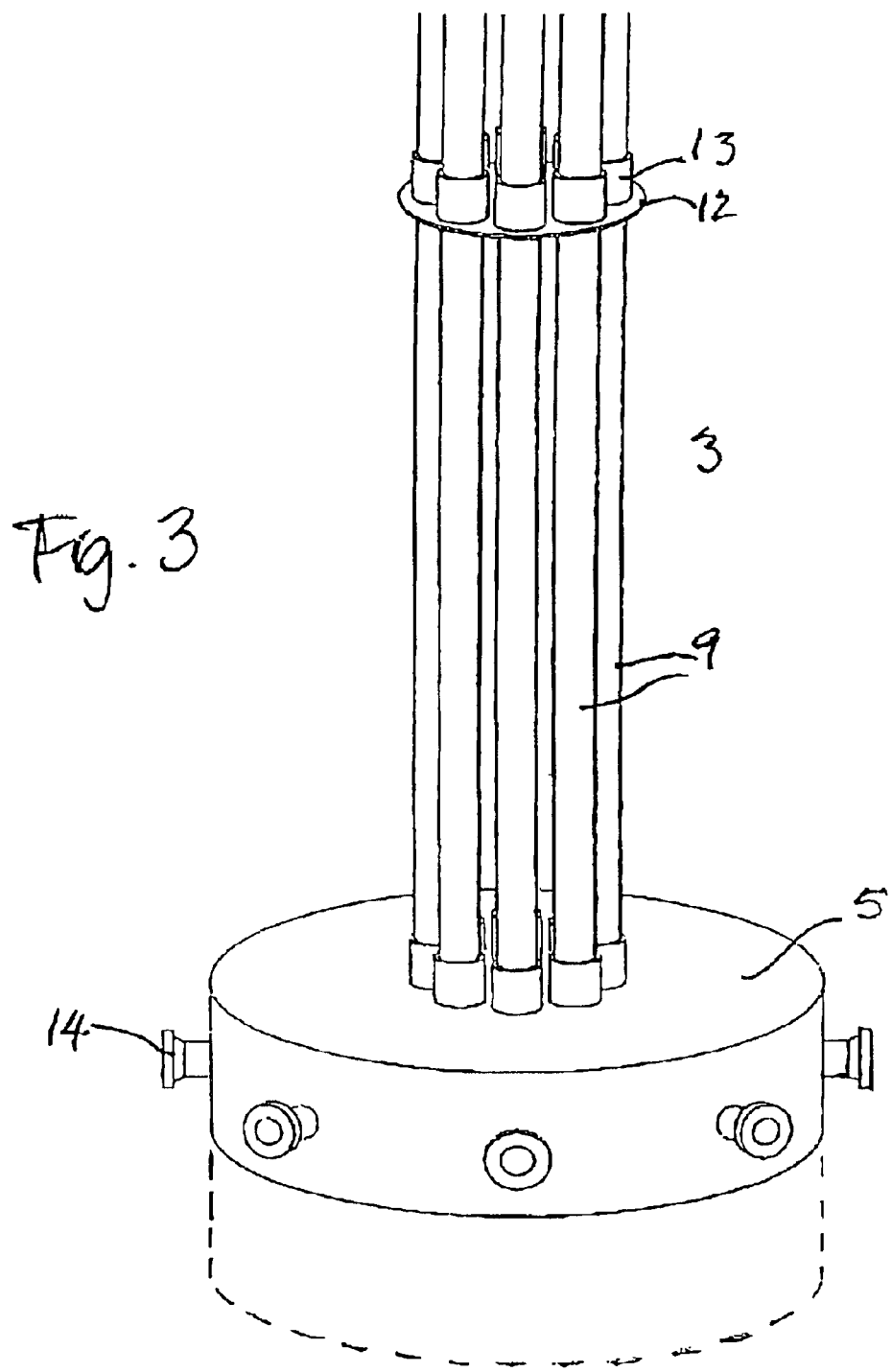
FIG. 3 is a fragmentary perspective view of the bottom part of the riser in FIG. 1.

Details of the riser tower 4 are shown in FIGS. 2 and 3, FIG. 3 showing the lower part of the tower connected to the base 5 and FIG. 2 showing a section of the tower, e.g. somewhat like the upper part in FIG. 3, partly broken away and partly in cross-section.

The tower comprises eight guide conduits 9, preferably made of aluminum or an aluminum alloy such as Al 6082, five of which are shown in FIG. 2. A plurality of these conduits, e.g. seven of them, contains a riser pipe 10 of substantial smaller diameter, as shown in the sectioned conduit in the left part of FIG. 2. The conduit not containing a riser pipe may contain an umbilical and other service lines leading to equipment on the ocean floor. The diameter of the guide conduits 9 and riser pipes 10 may be 20 cm and 10 cm, respectively.

Centrally located in the tower 4 is a pipe 11, for instance made of steel, that may serve as an export conduit for products from the production ship 1. The central pipe 11 carries a number of guide plates 12 arranged at regular intervals along the riser tower 4 and clamped between connecting flanges of the central pipe 11, the guide plates carrying guide sleeves 13 for the guide conduits 9 to keep the conduits apart when deflected by current forces. The guide sleeves may contain a low friction material to facilitate axial movement of the guide conduits 9 with respect to the guide plate 12.

The soft buoyancy tank 6 constituting the top of the riser configuration according to the invention supports the guide conduits 9 and their riser pipes 10. The upper part of the guide conduits is provided with an increasing wall thickness so as to act as a stress joint. This stress joint is rigidly connected to the tank 6. A similar type of stress joint constitutes the lower part of the guide conduits 9, extending e.g. between the guide plate 12 and the base 5 shown in FIG. 3. Consequently, the guide conduits 9 are rigidly connected to the base 5, thus avoiding the need for expensive flexible connections in this area.

Also the internal riser pipes 10 are rigidly connected to the base 5 and internal piping leading to respective external connections 14 spaced along the periphery of the base 5. The fixed base 5 and rigid connections 14 are cost efficient in that they permit conventional pull-in and connection of pipelines.

A principal feature of the present invention is the dual purpose served by the aluminum guide conduits 9. Firstly, the guide conduit will restrain the steel riser pipe 10 confined therein so that it can be allowed to buckle in elastic deformation when subjected to elongation caused by high temperature and internal pressure. This buckling occurs in two orthogonal planes with a 90° phase lag, thus forming a spiral in accordance with the Euler equation. This spiral form assumed by the riser pipe 10 is suggested in FIG. 2. As a result, this controlled buckling will permit the use of a relatively thin-walled riser pipe without the need for separate tensioning means. Furthermore, the individual riser pipes 10 in the riser configuration according to the invention may operate at different pressures and temperatures and, consequently, different degrees of elongation, without causing support problems since the different elongations will simply lead to varying wave lengths of the spirals.

Secondly, the aluminum guide conduits 9 serve as tethers for the buoyancy tank 6, thus doing away with the dedicated tethers used in prior art hybrid risers. Furthermore, the relatively inexpensive aluminum pipes provide necessary buoyancy at a much lower cost than the foam buoyancy otherwise required for tow-out and installation.

In normal service, the guide conduits 9 may be pressurized with a gas-like air or nitrogen to prevent implosion from occurring due to the external hydrostatic pressure. It is also envisioned to fill the annular space between the riser pipe 10 and guide conduit 9 with a gel, e.g. a paraffin gel, to reduce the heat transfer between the riser pipe 10 carrying hot produced oil and the cooler guide conduit 9 having the temperature of the surrounding sea water. Several measures may be taken to avoid corrosion of the materials in the annular space, like providing the riser pipe 10 with a coating of a polymer material or spray-coating it with aluminum. The inside of the aluminum (alloy) guide conduit 9 may be subjected to an anodizing process. Also, a spacer ring of an insulating material may be installed at regular intervals inside the conduit to prevent metal contact with the riser pipe.

In general, while the aluminum guide conduits may be provided with sufficient corrosion allowance to allow them to act as anodes for steel end fittings of riser pipes and flexible jumpers, it is simpler to provide sacrificial anodes to protect the entire structure. Careful analysis has shown that, contrary to common prejudice within the industry, it will be quite safe to mix steel and aluminum in a sub-sea structure like that of the present invention.

Figure 4:
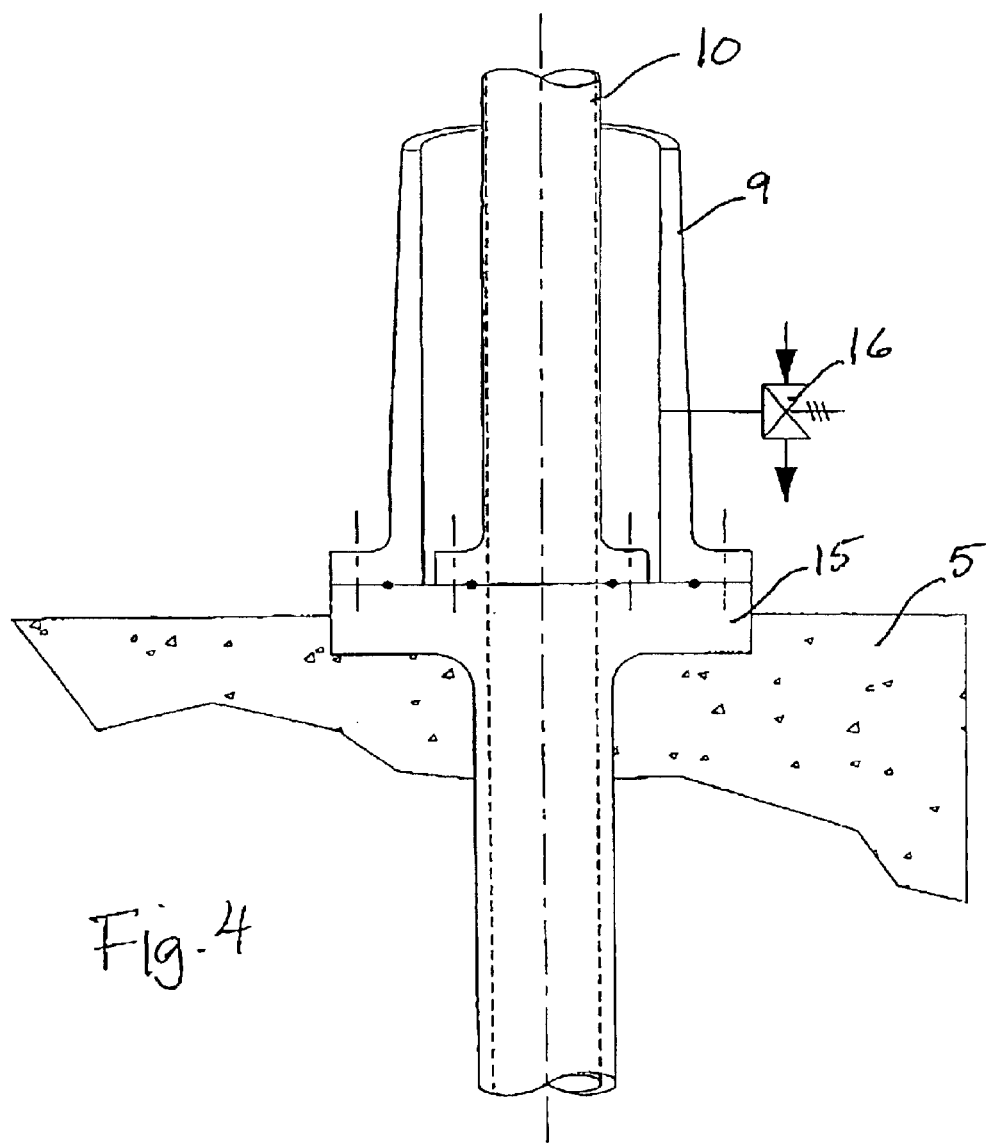
FIG. 4 is a vertical cross-section through an end connection for use in the riser in FIG. 1.

Referring now to FIG. 4, the lower termination of a riser pipe 10 and its guide conduit 9 at the base 5 is shown. The tapering wall thickness of the stress joint forming the lower part of the guide conduit 9 will be apparent from the figure. Both the conduit 9 and riser pipe 10 are provided with compact end flanges, which are bolted to the flange 15 of a connecting pipe cast into the base 5 and leading to one of the connections 14 shown in FIG. 3. The compact flanges may have a seal system (not shown) which allows interfacing of different materials without giving rise to galvanic corrosion or crevice corrosion on the mating faces.

FIG. 4 also shows a valve 16 connected to the annulus between the conduit 9 and pipe 10. This valve controls the differential pressure between the annulus and the surrounding sea water and is set such that it will allow ingress of water into the annulus well before the differential pressure becomes high enough to crush the guide conduit 9. Also, the valve 16 serves to permit flow out of the annulus if the pressure therein should exceed the external pressure by a predetermined amount, e.g. to permit purging the annulus of sea water that may have entered the annulus. This may occur during installation of the riser configuration, as will be explained below.

The upper termination of the guide conduit 9 and riser pipe 10 may be quite similar to that shown in FIG. 4, although the concrete base will of course be replaced by some other suitable structure on the soft tank 6 obvious to the skilled person.

The riser tower according to the invention may preferably be fabricated on a roller bed or rail bed from which it can be launched, The connections to the buoyancy tank 6 and foundation 5 are made during the launching process. The riser will be made nearly neutrally buoyant. To achieve this, at least some of the guide conduits 9, and preferably all the riser pipes 10, will be used for buoyancy. A heave compensator will be provided at the buoyancy tank, which will be flooded so as to act as a clump weight.

Figure 5:
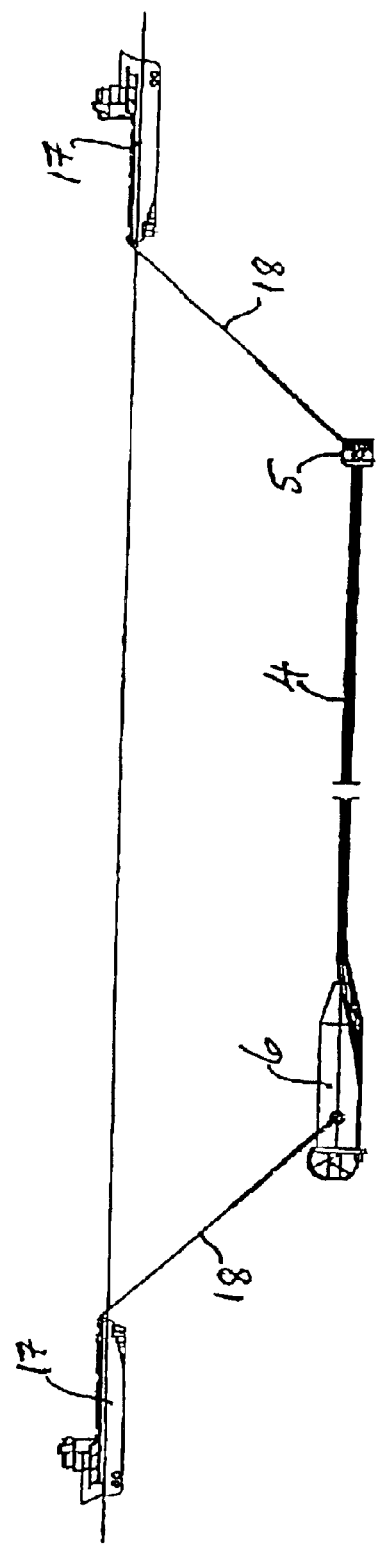
FIG. 5 is a schematic elevational view illustrating a method for installing the riser in FIG. 1.

The tow-out will initially be performed as a surface or near-surface tow. In deeper water it may be lowered and completed as a sub-surface tow to reduce the effect of wave forces, as illustrated in FIG. 5. Here, surface vessels 17 provide a substantial tension in the towing wires 18, thus creating sufficient tension in the tower 4 to prevent its net buoyancy, whether slightly negative or positive, from severely bending the tower. When the tow reaches the installation site, the towing wire at the base 5 end is paid out so that the tower 4 is slowly up-ended while being suspended in the heave compensated towing wire 18 at the tank 6 end. When the base end of the tower has reached a certain depth, the hydrostatic pressure will be such that the differential pressure valves 16 (FIG. 4) will open to let water into the annulus between the guide conduit 9 and riser pipe 10 in order to prevent the external hydrostatic pressure from imploding the conduits 9 during the remainder of the descent towards the ocean floor 2.

Once the riser tower is vertical, the base end towing wire is released and lowering will continue from the top end to allow the base 5, which may be provided with a suction skirt, to penetrate the mud-line, followed by application of suction to complete the installation of the base. When the base 5 is in place, the buoyancy tank 6 is filled with compressed air or other gas to purge the ballast water and provide tension in the combined guide conduits and tethers 9. The final step of connecting the flexible jumper hoses 7 and 8 between the buoyancy tank 6 and the production tanker 1 to complete the hybrid riser does not form part of the present invention.

Based on historical data from the prior art, the principal risk during tow-out and installation is loss of temporary buoyancy. In the present invention, temporary buoyancy is not required since sufficient buoyancy is provided by the structure itself. Each of the guide conduits 9 consists of two compartments: the steel riser pipe 10 inside and the annular space between the riser pipe and the inside of the guide conduit. During tow-out and installation, and also in service, the flooding of one compartment can be allowed without consequence to the design.

An alternative approach to installation, although not considered the most beneficial, is offshore assembly from a drilling platform. In this case, the riser base 5 is initially hung off in a spider on the cellar deck. Guide conduit and riser pipe sections are then installed with the derrick of the drilling platform.

It will be understood that the present invention is not limited to the exemplifying embodiments shown in the drawings and discussed above, but may be varied and modified by the skilled person within the scope of the invention defined by the appended claims. Furthermore, it will be understood that the present invention provides a number of significant advantages which may be summarized as follows:

- Use of costly buoyancy materials such as syntactic foam is eliminated.
- Use of temporary buoyancy materials is not required during any phase of tow-out or installation.
- Aluminum conduits are light in weight, further reducing the requirement for buoyancy.
- Aluminum conduits give cathodic protection to other parts of the rigid riser structure.
- The use of flexible pipes and connections to pipelines at the riser base is eliminated. Direct pull-in of rigid flowlines and pipelines may be achieved using field-proven equipment.
- The central tubular member in the rigid riser, used as a tensile structural member in former examples of hybrid risers, is eliminated. Instead, one or more export riser pipes may be included in the center of the structure.
- Tow-out and installation of the rigid riser portion can now be achieved in a single operation. The concept is also adaptable for installation from a drilling platform, or similar.
- All off shore assembly work may be eliminated.
- Hot water may be circulated through the conduits to heat the riser pipes.

What is claimed is:

1. A hybrid riser configuration having a submerged tower comprising a plurality of riser pipes substantially inserted in guide conduits, and also having buoyancy means acting as tower tensioning means, the riser pipes and guide conduits being connected to a base anchored to the ocean floor, wherein a plurality of the guide conduits are acting as multiple tethers, each guide conduit further acting as a radial constraint in elastic spiral deformation of the riser pipe inside, wherein during tow-out and installation, the guide conduits provide necessary buoyancy to make the riser configuration, except the base and buoyancy means, nearly neutrally buoyant.

2. A hybrid riser configuration according to claim 1, wherein the riser pipes and guide conduits are rigidly connected both to the base and the buoyancy means of the riser configuration.

3. A hybrid riser configuration according to claim 1, wherein the material of the guide conduits comprises aluminium or a similar light metal.

4. A hybrid riser configuration according to claim 1, wherein the riser configuration is protected by sacrificial anodes.

5. A hybrid riser configuration according to claim 2, wherein the material of the guide conduits comprises aluminium or a similar light metal.

6. A hybrid riser configuration according to claim 2, wherein the riser configuration is protected by sacrificial anodes.

7. A hybrid riser configuration according to claim 2, wherein during tow-out and installation, the guide conduits provide necessary buoyancy to make the riser configuration, except the base and buoyancy means, near neutrally buoyant.

8. A hybrid riser configuration according to claim 3, wherein the riser configuration is protected by sacrificial anodes.

9. A hybrid riser configuration according to claim 3, wherein during tow-out and installation, the guide conduits provide necessary buoyancy to make the riser configuration, except the base and buoyancy means, near neutrally buoyant.

10. A method for installing a riser configuration having a submerged tower comprising a plurality of riser pipes substantially inserted in guide conduits and also having a buoyancy tank and gravity base connected by said riser pipes and guide conduits, comprising the steps of:

- fabricating a bundle of guide conduits and riser pipes on a roller bed or rail bed from which it can be launched,
- connecting the buoyancy tank and gravity base to opposite ends of said bundle,
- sealing at least a plurality of the guide conduits and riser pipes of the bundle,
- launching the resultant structure and connecting the buoyancy tank and gravity base ends of the structure to respective towing vessels via towing wires,
- flooding the buoyancy tank to provide it with substantial negative buoyancy so that both the tank and the base will act as clump weights,
- towing the structure to the offshore location for its installation as a sub-surface tow while maintaining sufficient angle and tension in the towing wires to maintain substantial tension in the pipe bundle,
- lowering the base end of the structure by paying out the towing wire connected to the base,
- permitting water to enter the spaces formed between the riser pipes and their respective guide conduit when the base has reached a predetermined depth in order to limit the differential pressure across the wall of the guide conduits,
- continuing to lower the base end of the structure until the structure is perpendicular and suspended from the towing wire connected to the buoyancy tank, and
- lowering the structure to allow the base to penetrate the bottom mud-line and anchoring the base to the ocean floor, and removing the water ballast and towing wire from the buoyancy tank, thus providing tension in the guide conduits.

11. A method according to claim 10, wherein a motion compensating system is employed in the towing wire between the buoyancy tank and surface vessel.

12. A method according to claim 10, wherein the guide conduits are fabricated by welding together sections of aluminium pipe using friction stir welding.

13. A method according to claim 10, wherein said guide conduits are made by joining sections of aluminium pipe which are made with a longitudinal seam welded by means of friction stir welding.

14. A method according to claim 10, wherein at least some of the annular spaces between the riser pipers and the corresponding guide conduits are filled with a gel after expelling any water having entered said spaces during installation of the structure.

15. A method according to claim 11, wherein the guide conduits are fabricated by welding together sections of aluminiun pipe using friction stir welding.

16. A method according to claim 11, wherein said guide conduits are made by joining sections of aluminium pipe which are made with a longitudinal seam welded by means of friction stir welding.

17. A method according to claim 11, wherein at least some of the annular spaces between the riser pipes and the corresponding guide conduits are filled with a gel after expelling any water having entered said spaces during installation of the structure.

18. A method according to claim 12, wherein said guide conduits are made by joining sections of aluminium pipe which are made with a longitudinal seam welded by means of friction stir welding.

19. A method according to claim 12, wherein at least some of the annular spaces between the riser pipes and the corresponding guide conduits are filled with a gel after expelling any water having entered said spaces during installation of the structure.

* * * * *